United States Patent
Mabogunje et al.

(10) Patent No.: US 9,710,787 B2
(45) Date of Patent: Jul. 18, 2017

(54) SYSTEMS AND METHODS FOR REPRESENTING, DIAGNOSING, AND RECOMMENDING INTERACTION SEQUENCES

(71) Applicant: The Board of Trustees of the Leland Stanford Junior University, Stanford, CA (US)

(72) Inventors: Adegboyega Mabogunje, Mountain View, CA (US); Neeraj Sonalkar, Menlo Park, CA (US); Larry J. Leifer, Stanford, CA (US); Shashikant Khandelwal, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 953 days.

(21) Appl. No.: 13/955,425

(22) Filed: Jul. 31, 2013

(65) Prior Publication Data
US 2015/0039289 A1    Feb. 5, 2015

(51) Int. Cl.
*G06F 17/28* (2006.01)
*G06Q 10/10* (2012.01)

(52) U.S. Cl.
CPC ................ *G06Q 10/10* (2013.01)

(58) Field of Classification Search
CPC .................................................. G06Q 10/10
(Continued)

(56) References Cited

U.S. PATENT DOCUMENTS 7,124,164 B1 * 10/2006 Chemtob ............... G06Q 10/10
709/204
7,702,728 B2 * 4/2010 Zaner .................... H04L 12/581
709/205
(Continued)

FOREIGN PATENT DOCUMENTS

WO    WO 2004040440 A2 *  5/2004  ......... G06Q 10/0633
WO    WO 2014081176 A1 *  5/2014  ........... G06F 3/0488

OTHER PUBLICATIONS

Brereton et al., "Collaboration in Design Teams: How Social Interaction Shapes the Product", Analyzing Design, 1996, pp. 319-342.
(Continued)

*Primary Examiner* — Lamont Spooner
*Assistant Examiner* — Oluwadamilola M Ogunbiyi
(74) *Attorney, Agent, or Firm* — KPPB LLP

(57) ABSTRACT

Systems and methods for representing and diagnosing interaction sequences in accordance embodiments of the invention are disclosed. In one embodiment of the invention, a group interaction diagnosis and recommendation server system includes a processor and a memory configured to store a set of reference interaction data, where the reference interaction data includes a set of reference interaction sequences, wherein a group interaction diagnosis application configures the processor to obtain a set of group interaction data, generate an interaction model based on the group interaction data and an interaction dynamics language, determine at least one interaction sequence within the set of group interaction data based on the generated interaction model, identify at least one matching interaction sequence within the determined at least one interaction sequence, and recommend at least one improved interaction sequence
(Continued)

based on the identified at least one matching interaction sequence and the set of reference interaction data.

42 Claims, 5 Drawing Sheets

(58) Field of Classification Search
USPC .................................................. 705/10; 704/9
See application file for complete search history.

(56) References Cited

U.S. PATENT DOCUMENTS

| | | | |
|---|---|---|---|
| 7,793,259 B2* | 9/2010 | Robertson | G06Q 10/10 717/110 |
| 8,370,155 B2* | 2/2013 | Byrd | G06Q 10/10 379/88.01 |
| 8,495,510 B2* | 7/2013 | Pradhan | G06F 9/4443 715/764 |
| 8,874,616 B1* | 10/2014 | Coffman | G06Q 50/01 707/798 |
| 2002/0065708 A1* | 5/2002 | Senay | G06F 17/30604 705/7.32 |
| 2007/0078832 A1* | 4/2007 | Ott | G06F 17/30867 |
| 2007/0239797 A1* | 10/2007 | Cattell | G06F 17/30306 |
| 2008/0065468 A1* | 3/2008 | Berg | G06Q 30/02 705/7.32 |
| 2008/0148242 A1* | 6/2008 | Cobb | G06F 11/3466 717/130 |
| 2008/0235018 A1* | 9/2008 | Eggen | G10L 15/26 704/251 |
| 2009/0106040 A1* | 4/2009 | Jones | G06Q 50/01 705/319 |
| 2010/0070276 A1* | 3/2010 | Wasserblat | H04M 3/5232 704/243 |
| 2011/0131048 A1* | 6/2011 | Williams | G06F 3/167 704/270 |
| 2011/0209192 A1* | 8/2011 | LeClerc Greer | G06F 21/32 726/1 |
| 2011/0246584 A1* | 10/2011 | Vitaldevara | G06Q 10/107 709/206 |
| 2011/0307258 A1* | 12/2011 | Liberman | G10L 15/26 704/251 |
| 2012/0147123 A1* | 6/2012 | Lian | H04N 7/15 348/14.03 |
| 2013/0037040 A1* | 2/2013 | Dewey | A01H 5/12 131/290 |
| 2013/0110666 A1* | 5/2013 | Aubrey | G06Q 30/0269 705/26.5 |
| 2013/0226920 A1* | 8/2013 | Krishnan | G06F 17/30958 707/737 |
| 2014/0143737 A1* | 5/2014 | Mistry | G06F 3/0488 715/854 |
| 2014/0212853 A1* | 7/2014 | Divakaran | G09B 19/00 434/236 |
| 2014/0236731 A1* | 8/2014 | Schein | G06Q 50/01 705/14.66 |
| 2014/0280621 A1* | 9/2014 | Bourdaillet | G06Q 10/107 709/206 |
| 2014/0337034 A1* | 11/2014 | John | G10L 25/48 704/270 |

OTHER PUBLICATIONS

Eris, "Asking Generative Design Questions: A Fundamental Cognitive Mechanism in Design Thinking", Proceedings, International Conference on Engineering Design, 2003, 8 pgs.

Galinsky et al., "Power Reduces the Press of the Situation: Implications for Creativity, Conformity, and Dissonance", Journal of Personality and Social Psychology, 2008, vol. 95, No. 6, pp. 1450-1466.

Hargadon, "Firms as Knowledge Brokers: Lessons in Pursuing Continuous Innovation", California Management Review, Spring 1998, vol. 40, No. 3, pp. 209-227.

Hatchuel et al., "A New Approach of Innovative Design: An Introduction to C-K Theory", Proceedings, International Conference on Engineering Design, 2003, 15 pgs.

Mabogunje et al., "Noun Phrases as Surrogates for Measuring Early Phases of the Mechanical Design Process", Proceedings of DETC '97, 1997 ASME Design Engineering Technical Conferences, Sep. 14-17, 1997, pp. 1-6.

Solow, "A contribution to the theory of economic growth", The Quarterly Journal of Economics, 1956, vol. 70, pp. 65-94.

Solow, "Technical change and the aggregate production function", Review of Economics and Statistics, 1957, vol. 39, pp. 312-320.

Sonalkar et al., "Developing a visual representation to characterize moment-to-moment concept generation in design teams", International Journal of Design Creativity and Innovation, 2013, vol. 1, No. 2, pp. 93-108.

Sonalkar, Neeraj et al., "Systems and Methods for Representing, Diagnosing, and Recommending Interaction Sequences," Center for Design Research, Stanford University (unpublished).

* cited by examiner

US 9,710,787 B2

SYSTEMS AND METHODS FOR REPRESENTING, DIAGNOSING, AND RECOMMENDING INTERACTION SEQUENCES

FIELD OF THE INVENTION

The present invention is generally related to language analysis and more specifically the representation, diagnosis, and recommendation of interaction sequences within a group environment.

BACKGROUND

Linguistics is the study of human language and semiotics is the study of how meaning is symbolized through language. Various aspects of human language can be studied, including the grammar of human language, the manner in which language is expressed, and the meaning of language based on the structure of the language (e.g. semantics and pragmatics). Linguistics and semiotics further include analyzing how language is influenced by socioeconomic, historical, and political factors, and how they in turn are influenced by language.

SUMMARY OF THE INVENTION

Systems and methods for representing and diagnosing interaction sequences in accordance with embodiments of the invention are disclosed. In one embodiment of the invention, a group interaction diagnosis and recommendation server system includes a processor and a memory configured to store a group interaction diagnosis application and a set of reference interaction data, where the reference interaction data includes a set of reference interaction sequences, wherein the group interaction diagnosis application configures the processor to obtain a set of group interaction data, generate an interaction model based on the group interaction data and an interaction dynamics language, where the interaction dynamics language includes a set of labels describing actions that can occur in an interaction sequence, determine at least one interaction sequence within the set of group interaction data based on the generated interaction model, identify at least one matching interaction sequence within the determined at least one interaction sequence based on the set of reference interaction data, and recommend at least one improved interaction sequence within the at least one interaction sequence based on the identified at least one matching interaction sequence and the set of reference interaction data.

In another embodiment of the invention, the set of labels in the interaction dynamics language includes a subset of forward labels.

In an additional embodiment of the invention, the subset of forward labels is selected from the set of labels consisting of a "move" label, a "question" label, an "overcoming" label, a "deflection" label, and a "yes and" label.

In yet another additional embodiment of the invention, the set of labels in the interaction dynamics language includes a subset of blocking labels.

In still another additional embodiment of the invention, the subset of blocking labels is selected from the set of labels consisting of a "hesitation" label, a "block" label, and an "interruption" label.

In yet still another additional embodiment of the invention, the set of labels in the interaction dynamics language includes a subset of supporting labels.

In yet another embodiment of the invention, the subset of supporting labels is selected from the set of labels consisting of a "humor" label, a "support for move" label, and "a support for block" label.

In still another embodiment of the invention, the set of labels in the interaction dynamics language includes a label selected from the group consisting of a "beginning" label and an "ending" label.

In yet still another embodiment of the invention, a label in the set of labels in the interaction dynamics language includes timing data describing the time associated with the action corresponding to the label.

In yet another additional embodiment of the invention, a label in the set of labels in the interaction dynamics language includes member metadata describing the group member performing the action corresponding to the label.

In still another additional embodiment of the invention, the group interaction diagnosis application further configures the processor to identify at least one matching interaction sequence within the determined at least one interaction sequence by determining at least one subsequence of labels within the at least one interaction sequence, locating a relevant portion of the set of reference interaction data, where the relevant portion of the set of reference interaction data includes at least one reference subsequence of labels, and aligning the at least one subsequence of labels to the relevant portion of the set of reference interaction data so that the at least one subsequence of labels corresponds to the at least one reference subsequence of labels.

In yet still another additional embodiment of the invention, the group interaction diagnosis application further configures the processor to align the at least one subsequence of labels utilizing an algorithm similar to genomic sequence alignment algorithms selected from the group consisting of global alignments and local alignments.

In yet another embodiment of the invention, the group interaction diagnosis application further configures the processor to score the aligned subsequences based on the number of corresponding labels between the at least one subsequence of labels and the at least one reference subsequence of labels.

In still another embodiment of the invention, the group interaction diagnosis application further configures the processor to recommend at least one improved interaction sequence based on the scored aligned subsequences.

In yet still another embodiment of the invention, the group interaction diagnosis application further configures the processor to refine the reference interaction data based on the identified interaction sequences.

In yet another additional embodiment of the invention, the group interaction diagnosis application further configures the processor to refine the reference interaction data by locating at least one new interaction sequence within the at least one interaction sequence not present within the reference interaction data and including the at least one new interaction sequence in the reference interaction data.

In still another additional embodiment of the invention, a label in the set of labels in the interaction dynamics language includes space metadata describing the categorical space associated with the action corresponding to the label.

In yet still another additional embodiment of the invention, the space metadata is selected from the group consisting of an idea space and a reality space.

In yet another embodiment of the invention, the memory is further configured to store a intervention database, where the intervention database includes a set of intervention data and a set of interaction/intervention relationships, and the group interaction diagnosis application further configures the processor to identify at least one piece of intervention data based on the recommended at least one interaction sequence, where a piece of intervention data in the set of intervention data includes data utilized by the coach to guide the members of the group through an interaction process.

Still another embodiment of the invention includes a method for representing, diagnosing, and recommending group interactions, including obtaining a set of group interaction data using a group interaction diagnosis and recommendation server system, generating an interaction model based on the group interaction data and an interaction dynamics language using the group interaction diagnosis and recommendation server system, where the interaction dynamics language includes a set of labels describing actions that can occur in an interaction sequence, determining at least one interaction sequence within the set of group interaction data based on the generated interaction model using the group interaction diagnosis and recommendation server system, identifying at least one matching interaction sequence within the determined at least one interaction sequence based on a set of reference interaction data using the group interaction diagnosis and recommendation server system, where the reference interaction data includes a set of reference interaction sequences, and recommending at least one improved interaction sequence within the at least one interaction sequence based on the identified at least one matching interaction sequence and the set of reference interaction data using the group interaction diagnosis and recommendation server system.

In yet another additional embodiment of the invention, the set of labels in the interaction dynamics language includes a subset of forward labels.

In still another additional embodiment of the invention, the subset of forward labels is selected from the set of labels consisting of a "move" label, a "question" label, an "overcoming" label, a "deflection" label, and a "yes and" label.

In yet still another additional embodiment of the invention, the set of labels in the interaction dynamics language includes a subset of blocking labels.

In yet another embodiment of the invention, the subset of blocking labels is selected from the set of labels consisting of a "hesitation" label, a "block" label, and an "interruption" label.

In still another embodiment of the invention, the set of labels in the interaction dynamics language includes a subset of supporting labels.

In yet still another embodiment of the invention, the subset of supporting labels is selected from the set of labels consisting of a "humor" label, a "support for move" label, and "a support for block" label.

In yet another additional embodiment of the invention, the set of labels in the interaction dynamics language includes a label selected from the group consisting of a "beginning" label and an "ending" label.

In still another additional embodiment of the invention, a label in the set of labels in the interaction dynamics language includes timing data describing the time associated with the action corresponding to the label.

In yet still another additional embodiment of the invention, a label in the set of labels in the interaction dynamics language includes member metadata describing the group member performing the action corresponding to the label.

In yet another embodiment of the invention, identifying at least one matching interaction sequence within the determined at least one interaction sequence includes determining at least one subsequence of labels within the at least one interaction sequence using the group interaction diagnosis and recommendation server system, locating a relevant portion of the set of reference interaction data using the group interaction diagnosis and recommendation server system, where the relevant portion of the set of reference interaction data includes at least one reference subsequence of labels, and aligning the at least one subsequence of labels to the relevant portion of the set of reference interaction data so that the at least one subsequence of labels corresponds to the at least one reference subsequence of labels using the group interaction diagnosis and recommendation server system.

In still another embodiment of the invention, aligning the at least one subsequence of labels utilizes genomic sequence alignments selected from the group consisting of global alignments and local alignments.

In yet still another embodiment of the invention, the method further includes scoring the aligned subsequences based on the number of corresponding labels between the at least one subsequence of labels and the at least one reference subsequence of labels using the group interaction diagnosis and recommendation server system.

In yet another additional embodiment of the invention, the method includes recommending at least one improved interaction sequence based on the scored aligned subsequences using the group interaction diagnosis and recommendation server system.

In still another additional embodiment of the invention, the method includes refining the reference interaction data based on the identified interaction sequences using the group interaction diagnosis and recommendation server system.

In yet still another additional embodiment of the invention, refining the reference interaction data includes locating at least one new interaction sequence within the at least one interaction sequence not present within the reference interaction data using the group interaction diagnosis and recommendation server system and including the at least one new interaction sequence in the reference interaction data using the group interaction diagnosis and recommendation server system.

In yet another embodiment of the invention, a label in the set of labels in the interaction dynamics language includes space metadata describing the space associated with the action corresponding to the label.

In still another embodiment of the invention, the space metadata is selected from the group consisting of an idea space and a reality space.

In yet still another embodiment of the invention, the method includes identifying at least one piece of intervention data based on the recommended at least one interaction sequence using the group interaction diagnosis and recommendation server system, where a piece of intervention data in the set of intervention data includes data utilized by the coach to guide the members of the group through a more effective interaction process.

DETAILED DESCRIPTION

Figure 1:
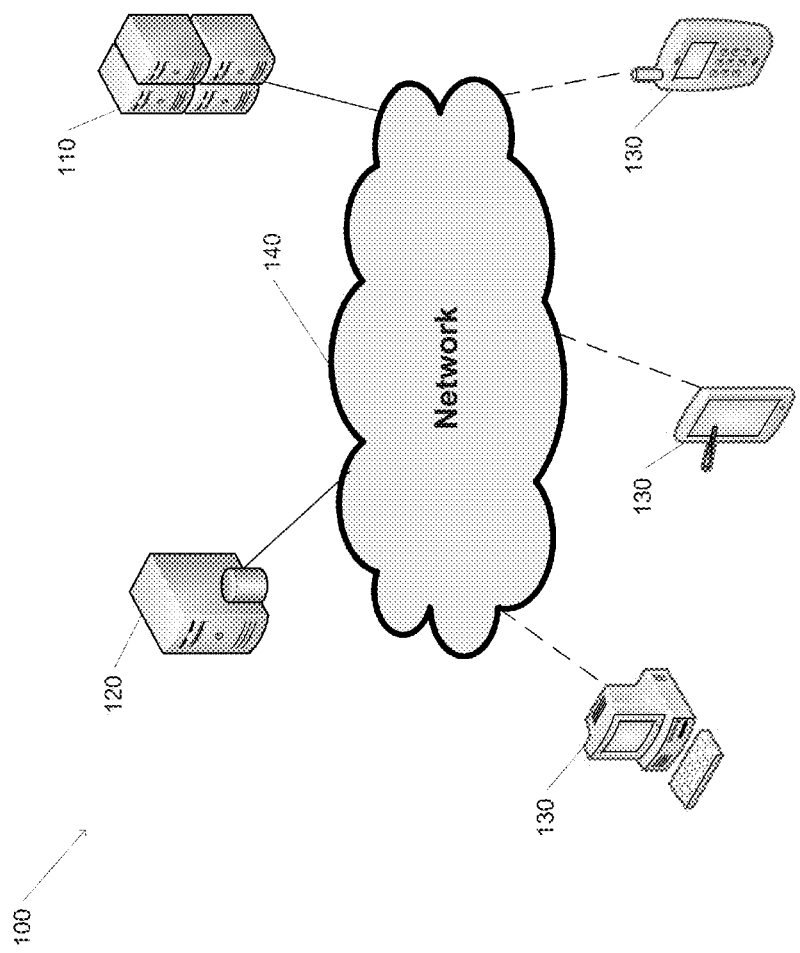
FIG. 1 conceptually illustrates a group interaction diagnosis and recommendation system in accordance with an embodiment of the invention.

Turning now to the drawings, systems and methods for representing and recommending interaction sequences in accordance with embodiments of the invention are illustrated. People often work as a team in order to solve problems and complete projects. Interactions between human beings are very complicated, and individual styles of communication can lead to ineffective collaboration between people. In many cases, a good idea can be lost with an inarticulate presentation and promising group interactions can be unintentionally derailed with unsupportive or blocking behaviors. The problem is further complicated by the fact that actions that are socially acceptable within one culture can be socially unacceptable in another.

Group interaction recommendation systems in accordance with embodiments of the invention are configured to generate representations of group interactions and recommend interaction sequences based on the generated representations. Group interaction recommendation systems represent interaction sequences that occur within a group interaction using an interaction dynamics language including a set of labels that describe actions that can occur in response to an action (e.g. a statement or other declarative action) by a speaker during a collaborative group interaction. In several embodiments, the interaction dynamics language provides a (spoken) language and/or culturally independent model of the interactions between the members of the target group. The labels can be divided into categories as appropriate to the requirements of specific applications in accordance with embodiments of the invention. Categories of labels include forward labels, blocking labels, and supporting labels. Forward labels indicate actions by group members that cause the group interaction to advance in a particular direction. Blocking labels indicate actions by group members that obstruct the flow of a forward action, while supporting labels indicate agreement and/or approval with an action. Other labels, such as labels indicating the beginning and/or ending of an interaction sequence, can be included in the interaction dynamics language as appropriate to the requirements of specific applications in accordance with embodiments of the invention. The interaction dynamics language also identifies transitions between a space of ideas (idea expressions) and a space of reality (certainty expressions). In a variety of embodiments, the space of ideas includes ideas and/or concepts expressed by the statements made by the group members that could exist within the real world. In several embodiments, the space of reality includes ideas and/or concepts expressed by the statements made by the group members that do exist within the real world. Depending on the context of actions within the group interactions, the labels associated with the actions can be associated with the idea space and/or the reality space, providing additional insights and context to the interactions of the group members.

Group interaction recommendation systems process interaction sequences encoded in an interaction dynamics language. Some or all of the labels in an encoded interaction sequence are compared with a set of reference interaction sequences contained in a set of reference interaction data. As is discussed in more detail below, a number of sequence matching techniques can be utilized to compare the reference interaction sequences with the encoded interaction sequences as appropriate to the requirements of specific applications in accordance with embodiments of the invention. When a matching sequence is located, the group interaction recommendation system is configured to identify if the matching sequence could result in an improved interaction relative to the encoded interaction sequence. Those reference interaction sequences that can improve the group interactions are recommended to improve the interactions of the group moving forward. In many embodiments, the group interaction recommendation system is configured to provide the identified sequences to the group to allow the group to discover its own techniques for performing the identified interaction sequence. Additionally, group interaction recommendation systems can identify potentially detrimental and/or beneficial members of a group interaction and recommend adjustments to the makeup of the group in order to improve the group interactions as appropriate to the requirements of specific applications in accordance with embodiments of the invention.

In several embodiments, the group interaction recommendation system is configured to refine the set of reference interaction sequences based on the observed encoded interaction sequences. By refining the set of reference interaction sequences, the group interaction recommendation system is capable of incorporating the benefits of the improved group interactions and continue to recommend potentially improved interactions to those groups that already perform well.

Although the above is described with respect to an interaction dynamic language having forward, blocking, and supporting labels, a variety of alternative languages and/or labels can be utilized as appropriate to the requirements of specific applications in accordance with embodiments of the invention. Systems and methods for representing and recommending interaction sequences in accordance with embodiments of the invention are discussed below.

Group Interaction Recommendation Systems

Group interaction recommendation systems in accordance with embodiments of the invention are configured to obtain a set of group interaction data and identify interaction sequences within the group interaction data where the performance of the group could be improved. A conceptual illustration of a group interaction recommendation system in accordance with an embodiment of the invention is shown in FIG. 1. The group interaction recommendation system 100 includes a group interaction recommendation server system 110 connected to a group interaction database 120 and, in a variety of embodiments, one or more group interaction devices 130 via network 140. In many embodiments, the group interaction recommendation server system 110 and the group interaction database 120 are implemented using a single server. In a variety of embodiments, the group interaction recommendation server system 110 and/or the group interaction database 120 are implemented using a plurality of servers. Group interaction devices 130 include any of a variety of network-connected devices, including personal computers, tablets, and mobile devices as appropriate to the requirements of specific applications in accordance with embodiments of the invention. In many embodiments, group interaction devices 130 are implemented utilizing the group interaction recommendation server system 110. Network 140 can be one or more of a variety of networks, including, but not limited to, wide-area networks, local area networks, and/or the Internet as appropriate to the requirements of specific applications in accordance with embodiments of the invention.

The group interaction recommendation server system 110 is configured to obtain group interaction data reference interaction data, and/or intervention data from the group interaction database 120. In a variety of embodiments, the group interaction database 120 and/or the group interaction recommendation server system 110 receives group interaction data from the group interaction devices 130. The group interaction data includes group interactions between the various members of the group; group interactions include, but are not limited to, actions made by a speaker within the group. The actions can include member metadata describing the member(s) of the group performing the actions. The group interaction data can also include timing data describing the time and/or timing regarding the actions, and other group interactions. The group interaction recommendation server system 110 is configured to determine interaction sequences within the group interaction data and encode those interaction sequences using an interaction dynamics language. The determined interaction sequences are compared with a set of reference interaction data to identify portions of the determined interaction sequences that could be potentially improved upon. Recommendations are made by the group interaction recommendation server system 110 to improve the interactions of the group based on the identified portions of the encoded interaction data. In a variety of embodiments, the group interaction recommendation server system 110 is configured to refine the set of reference interaction data based on the observed interaction sequences. In this way, the group interaction server system 110 is capable of automatically identifying new and useful interaction sequences and recommending those sequences to groups. In many embodiments, the recommendations made by the group interaction recommendation server system 110 include recommendations to change the makeup (e.g. the membership) of the group to better facilitate communication and interaction within the group.

The group interaction data and/or the intervention data can include audio data, video data, text data, and/or any other form of data as appropriate to the requirements of specific applications in accordance with embodiments of the invention. Group interaction devices 130 are equipped with the appropriate hardware (e.g. cameras, microphones, touchscreens, and other input devices) in order to capture the various data included in the group interaction data. In a number of embodiments, the group interaction devices 130 are not utilized by the members of the group; rather, the group interaction devices 130 observe and record the interactions between the members of group. Many group interaction devices 130 are configured to receive recommendations from the group interaction recommendation server system 110 and present those recommendations to the group as appropriate to the requirements of specific applications in accordance with embodiments of the invention. In a variety of embodiments, the group members receive recommendations directly from the group interaction recommendation server system 110.

Group interaction recommendations systems in accordance with embodiments of the invention are described above with respect to FIG. 1; however, any of a variety of group interaction recommendation systems can be utilized in accordance with embodiments of the invention. Systems and methods for representing and recommending interaction sequences in accordance with embodiments of the invention are discussed below.

Group Interaction Recommendation Server Systems

Figure 2:
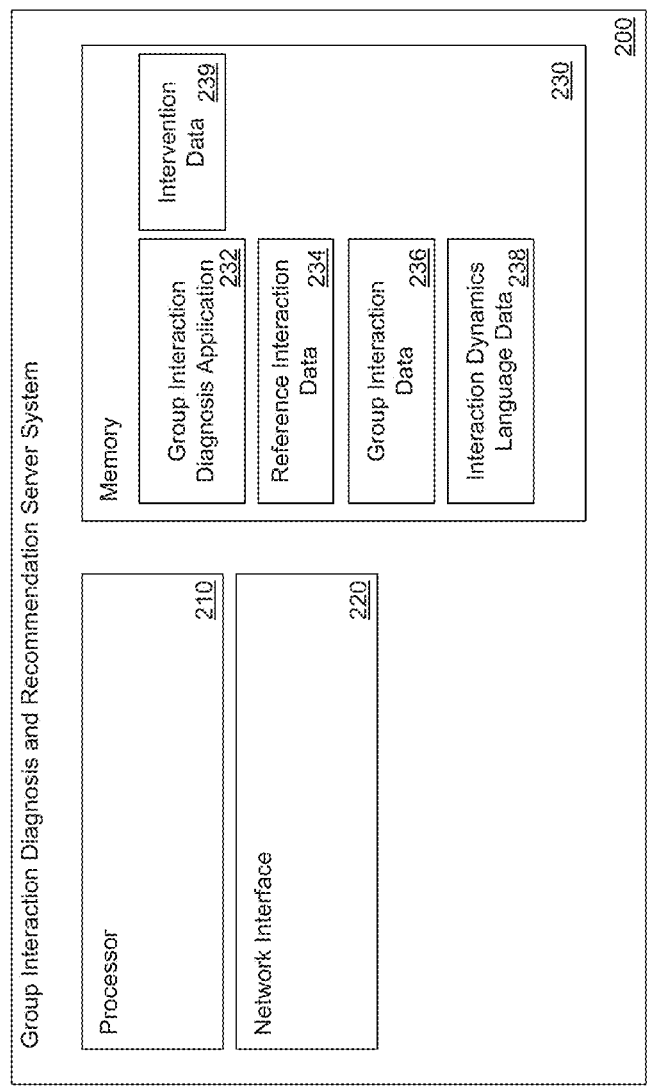
FIG. 2 conceptually illustrates a group interaction diagnosis and recommendation server system in accordance with an embodiment of the invention.

As discussed above, group interaction recommendation server systems are configured to generate representations of group interactions and make recommendations to improve the group interactions based on a set of reference interaction data. A group interaction recommendation server system in accordance with an embodiment of the invention is conceptually illustrated in FIG. 2. The graph group interaction recommendation server system 200 includes a processor 210 in communication with a memory 230. The group interaction recommendation server system 200 can also include a network interface 220 configured to send and receive data over a network connection. In a number of embodiments, the network interface 220 is in communication with the processor 210 and/or memory 230. In several embodiments, the memory 230 is any form of storage configured to store a variety of data, including, but not limited to, group interaction diagnosis application 232, reference interaction data 234, group interaction data 236, and interaction dynamics language data 238, and intervention data 239. In many embodiments, the reference interaction data 234, group interaction data 236, and/or interaction dynamics language data 238 are stored using an external server system and received by the group interaction recommendation server system 200 using the network interface 220. External server systems in accordance with a variety of embodiments include, but are not limited to, group interaction databases and other distributed storage services as appropriate to the requirements of specific applications in accordance with embodiments of the invention.

The group interaction diagnosis application 232 configures processor 210 to perform a group interaction recommendation process. The group interaction recommendation process includes obtaining group interaction data 236 including one or more actions by a speaker in a group. The group interaction recommendation process further includes encoding the group interaction data 236 based on the interaction dynamics language data 238, resulting in one or more interaction sequences within the group interaction data 236 represented using the labels included in the interaction dynamics language data 238. One or more of the encoded interaction sequences are matched with reference interaction sequences contained within the reference interaction data 234. Techniques for matching interaction sequences with reference interaction sequences that can be utilized as part of the group interaction recommendation process as appropriate to the requirements of specific applications in accordance with embodiments of the invention are described in more detail below.

When a matching sequence is located, the group interaction recommendation process includes identifying if the matching sequence could result in an improved group interaction relative to the encoded interaction sequence. Some or all of the improved interaction sequences are provided as recommended interaction sequences; the recommended interaction sequences can be utilized by a group to improve the interactions between the group members and, ideally, result in the group being more productive. It should be noted that the improved interaction sequences can include both recommending alternative group interactions and alternative group makeups, e.g. the recommendation can include removing one or more members of the group in order to promote improved interaction sequences between the remaining group members. The recommendations can be provided to a variety of parties as appropriate to the requirements of specific applications in accordance with embodiments of the invention, such as directly to the group members and/or to a coach who is facilitating (e.g. supporting) the group. In many embodiments, the recommendations are referenced against the intervention data 239, where the intervention data 239 includes a set of interaction/intervention action relationships. The coach for a group can use the recommendation to identify one or more intervention actions in the intervention data 239 that can be utilized by the coach to guide the members of the group through a more effective interaction process.

In a number of embodiments, the group interaction recommendation process also includes refining the reference interaction data 234 based on the observed interaction sequences within the group interaction data 236. A variety of techniques, including those described below, can be utilized in the refinement of the reference interaction data 234 as appropriate to the requirements of specific applications in accordance with embodiments of the invention. The recommended interaction sequences and/or refined reference interaction data 234 can be transmitted to external devices, such as a group interaction database and/or a group interaction device, using the network interface 220.

Group interaction recommendation server systems in accordance with embodiments of the invention are described above with respect to FIG. 2; however, a variety of architectures, including those that store data or applications on disk or some other form of storage and are loaded into the memory at runtime can be utilized in accordance with embodiments of the invention. Processes for representing and recommending interaction sequences in accordance with embodiments of the invention are discussed below.

Recommending Interaction Sequences

Figure 3:
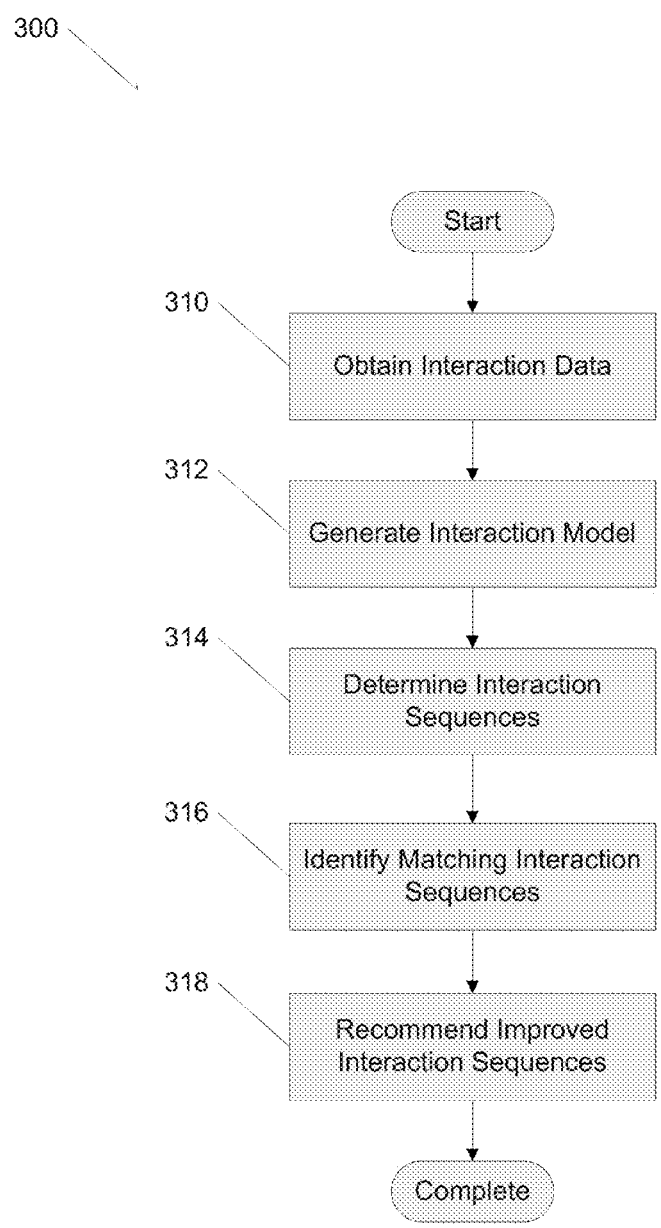
FIG. 3 is a flow chart conceptually illustrating a process for representing, diagnosing, and recommending interaction sequences in accordance with an embodiment of the invention.

The performance of a group at completing a task is related to the interactions between the group members. By improving the interactions between group members, the productivity of the group can be improved. Group interaction recommendation server systems in accordance with embodiments of the invention are configured to identify interaction sequences within a set of interaction data and make recommendations for improved interaction sequences based on a set of reference interaction data. A process for recommending interaction sequences for group interactions in accordance with an embodiment of the invention is conceptually illustrated in FIG. 3. The process 300 includes obtaining (310) interaction data. An interaction model is generated (312) and interaction sequences are determined (314). Matching interaction sequences are identified (316) and improved interaction sequences are recommended (318).

Interaction data includes one or more actions (as action data). In several embodiments, the interaction data includes timing data indicating a timestamp (and/or duration) associated with the action data. In several embodiments, the interaction data includes space metadata describing if the action is within an idea space and/or within a reality space. In a number of embodiments, the action data include metadata identifying the member(s) of the group associated with the action. Interaction data is obtained (310) from a variety of sources, such as group interaction databases and group interaction devices as appropriate to the requirements of specific applications in accordance with embodiments of the invention. An interaction model is generated (312) based on an interaction dynamics language, where the interaction dynamics languages includes a set of labels describing potential interactions within a group. In many embodiments, an interaction model is generated (312) using the labels within the interaction dynamics language based on the action data. Techniques for generating (312) the interaction model that can be utilized in a number of embodiments of the invention are described in more detail below.

The determined (314) interaction sequences include one or more labels within the generated (312) interaction model. Several criteria can be utilized to determine (314) points within the generated (312) interaction model to indicate the beginning (or ending) of an interaction sequence as appropriate to the requirements of specific applications in accordance with embodiments of the invention. These points include, but are not limited to, timing data associated with the labels, a "beginning" and/or an "ending" label, and identifying logical separations between interaction sequences within the interaction model based on the labels included in the interaction sequences. Identifying (316) matching interaction sequences includes comparing the determined (314) interaction sequences to one or more reference interaction sequences within a set of reference interaction data. The set of reference interaction data includes one or more reference interaction sequences, expressed using the labels of the interaction dynamics language, and reference interaction sequence metadata indicating the utility of the interaction sequence in a group interaction. A variety of criteria can be utilized to indicate the utility of an interaction sequence as appropriate to the requirements of specific applications in accordance with embodiments of the invention, such as an interaction score and/or metadata describing one or more labels and/or interaction sequences in which the reference interaction sequence is beneficial to a group interaction.

In a number of embodiments, sequence alignment techniques are utilized to identify (316) matching interaction sequences. Global sequence alignments (e.g. alignments between an entire reference interaction sequence and the determined (314) interaction sequence), local sequence alignments (e.g. alignments between a portion of the reference interaction sequence and a portion of the determined (314) interaction sequence), and/or a hybrid global/local sequence alignment can be utilized as appropriate to the requirements of specific applications in accordance with embodiments of the invention. In several embodiments, a scoring matrix is utilized to identify scores for matching (and/or not matching) labels within a pair of sequences. Using a scoring matrix, identifying (316) a matching interaction sequence within the set of reference interaction data to the determined (314) interaction sequence includes locating the reference interaction sequence(s) with the highest score (and/or a score above a threshold value) based on the matching labels between the reference interaction sequence (s) and the determined (314) interaction sequence. In several embodiments, one or more gaps (e.g. null labels in an interaction sequence) exist between subsequences of the reference interaction sequence and the determined (314) interaction sequence and the scoring of the matching labels includes an adjustment based on the gaps in the match. In a number of embodiments, a weight is assigned to matches between labels, mismatches between labels, and/or gaps in the matches between labels within a sequence. Other sequence alignment techniques, including those based on dynamic programming techniques, recurrence plots, and/or heuristic word subsequence techniques, and scoring techniques not including a scoring matrix can be utilized to identify (316) matching interaction sequences as appropriate to the requirements of specific applications in accordance with embodiments of the invention.

The recommendation (318) of improved interaction sequences includes identifying one or more matching (316) interaction sequences within the reference interaction data that are identified as being more conducive to group interaction than the corresponding determined (314) interaction sequence. In several embodiments, scores are associated with the matching (316) interaction sequence and the determined (314) interaction sequence and the recommended (318) interaction sequence is the sequence with the higher score and/or a score exceeding a recommendation threshold. In a number of embodiments, interaction sequences are recommended (318) based on the labels contained within the interaction sequence. In many embodiments, the recommended (318) interaction sequence includes reference interaction sequences that improve the number of actions associated with an idea space and/or transitions into actions associated with the idea space. A variety of alternative criteria can be utilized to determine an improved interaction sequence (as compared to the determined (314) interaction sequence) to be recommended (318) as appropriate to the requirements of specific applications in accordance with embodiments of the invention. In several embodiments, the recommended (318) improved interaction sequence(s) includes identifying one or more members of the group and recommending that the members be removed from the group based on the action data associated with the member(s). In a variety of embodiments, the recommended (318) improved interaction sequences are utilized to locate one or more intervention actions within a intervention database that can be utilized by a coach supporting the group to guide the members of the group through a more effective interaction process.

Although specific processes for the recommendation of interaction sequences are discussed above with respect to FIG. 3, any of a variety of processes, including those that provide alternative recommendations to those described above and those that utilize pattern matching techniques not described above can be performed in accordance with embodiments of the invention. Processes for generating interaction models and refining reference interaction data in accordance with embodiments of the invention are described below.

Generating Interaction Models

Figure 4:
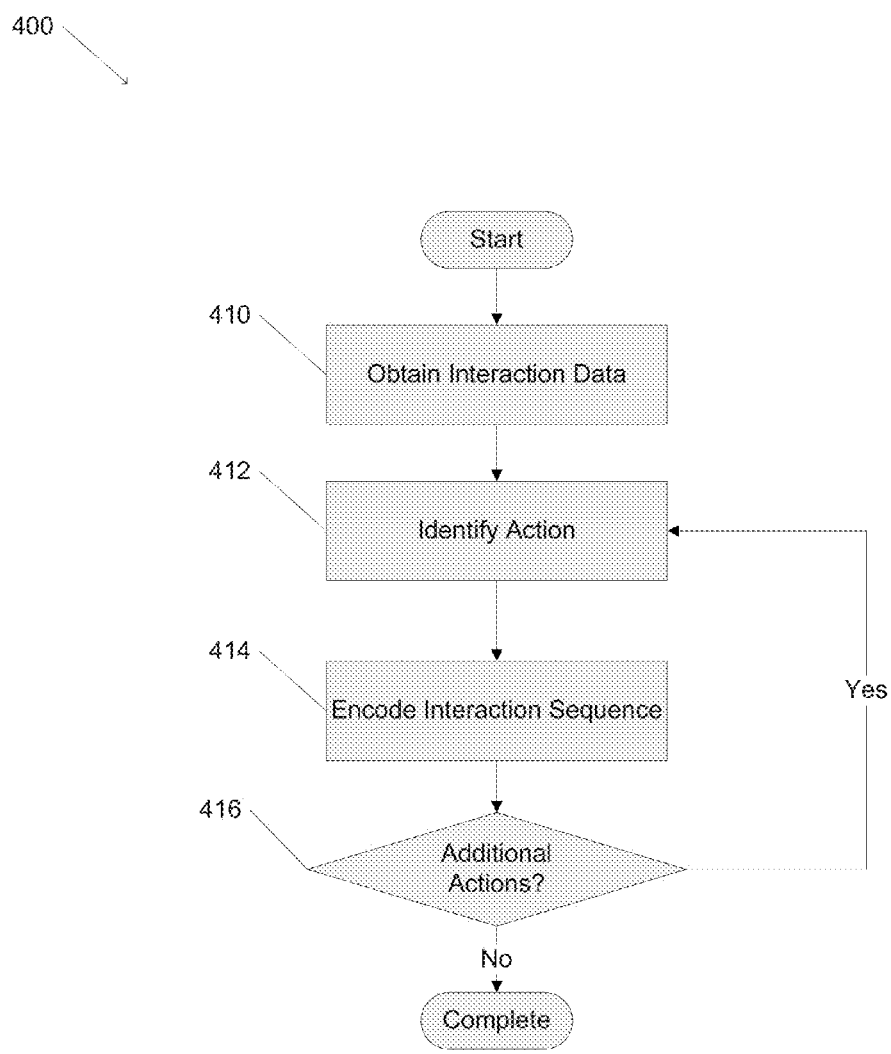
FIG. 4 is a flow chart conceptually illustrating a process for generating an interaction model in accordance with an embodiment of the invention.

The actions between members of a group can vary widely between different groups and across different cultures. Regardless of the actual actions taken by a member of the group, the actions correspond to positive, neutral, or negative interactions between the group members. Group interaction recommendation server systems in accordance with embodiments of the invention are configured to encode interaction data using an interaction dynamics language to generate interaction sequences. A process for generating interaction models including one or more interaction sequences in accordance with an embodiment of the invention is conceptually illustrated in FIG. 4. The process 400 includes obtaining (410) interaction data. An action is identified (412). The interaction sequence is encoded (414). If additional actions exist (416), additional actions are identified (412).

In many embodiments, interaction data is obtained (410) utilizing techniques similar to those described above. In a number of embodiments, identifying (412) an action includes locating an action within the action data in the obtained (410) interaction data and assigning a label from an interaction dynamics language to the action. In several embodiments, identifying (412) an action includes identifying if the action is within an idea space and/or within a reality space. A variety of techniques can be utilized to identify actions in accordance with embodiments of the invention, including analyzing timing data associated with the action and identifying the members of the group associated with the action. Alternative techniques can be utilized as appropriate to the requirements of specific applications in accordance with embodiments of the invention. In a number of embodiments, the assigned label includes metadata describing the group member(s) performing the identified (412) action.

Encoding (414) an interaction sequence includes incorporating the label associated with the action into the interaction sequence being generated. In a variety of embodiments, the encoded (414) interaction sequence also includes associating the timing data, member data identifying the group member(s) associated with the action, and/or data indicating if the action is within an idea space and/or a reality space with the identified (412) labels. If additional actions are present (416), additional actions are identified (412) and processed as described above. In a variety of embodiments, determining if additional actions are present (416) includes identifying if an action in the obtained (410) interaction data is associated with a label within the interaction dynamics corresponding to the beginning and/or ending of an interaction sequence. Upon reaching the end of the current interaction sequence (and/or the beginning of another interaction sequence), the process 400 continues to create additional interaction sequences that will be included in the interaction model based on the additional actions present within the obtained (410) interaction data. In many embodiments, the beginning and/or ending of an interaction sequence is inferred based on the actions in the obtained (410) interaction data.

Although specific processes for generating interaction models are discussed above with respect to FIG. 4, any of a variety of processes, including those that generate alternative representations of interaction data can be performed in accordance with embodiments of the invention. Processes for refining reference interaction data in accordance with embodiments of the invention are described below.

Refining Reference Interaction Data

Figure 5:
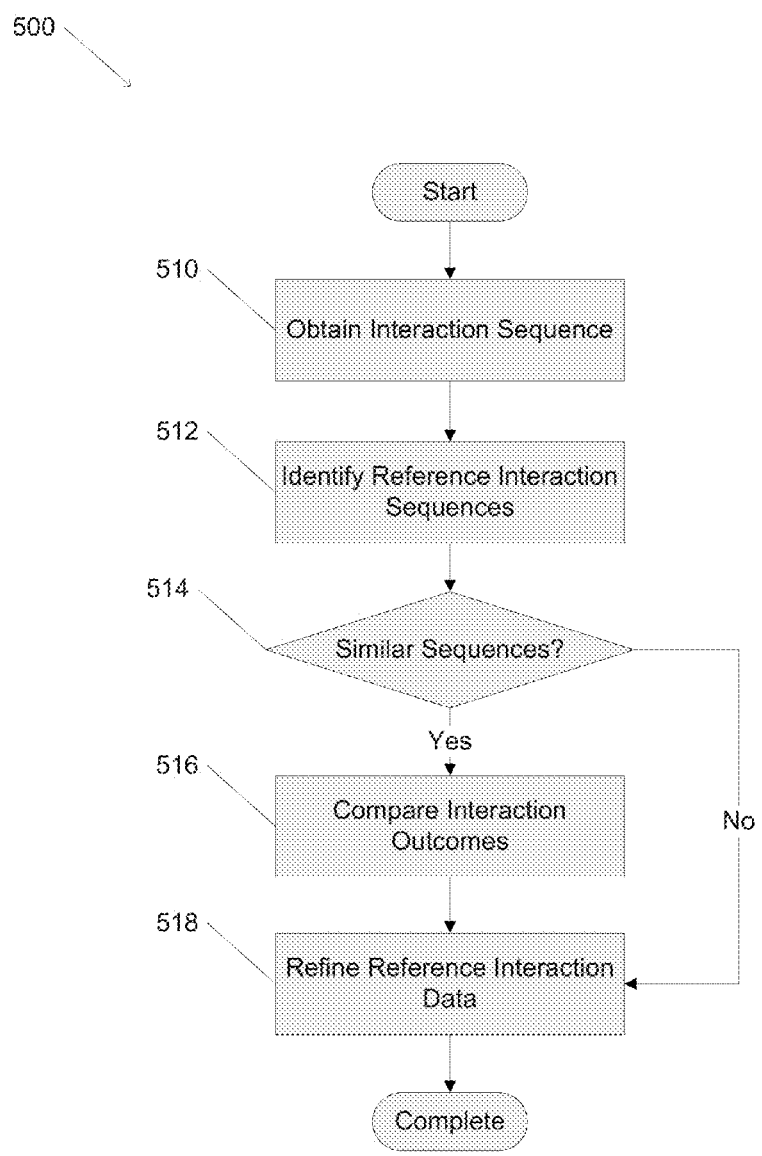
FIG. 5 is a flow chart conceptually illustrating a process for refining a reference interaction data set in accordance with an embodiment of the invention.

Reference interaction data includes interaction sequences that result in beneficial group interactions. By recommending improved interactions to groups based on reference interaction data, groups can improve their interactions. Groups can potentially discover new and/or improved interaction sequences (possibly in response to the recommended interactions) that demonstrate improved results relative to the reference interaction data. Group interaction recommendation server systems in accordance with embodiments of the invention are configured to analyze interaction sequences and determine if the reference interaction data includes the analyzed interaction sequences and refining the reference data based on the analyzed interaction sequences. A process for refining reference interaction data in accordance with an embodiment of the invention is conceptually illustrated in FIG. 5. The process 500 includes obtaining (510) an interaction sequence. Reference interaction sequences are identified (512). If a similar sequence does not exist (514), the reference interaction sequence is refined (518). If similar sequences exists (514), the interaction outcomes are compared (516) and the reference interaction data is refined (518).

In a variety of embodiments, interaction sequences are obtained (510) utilizing processes similar to those described above. In many embodiments, reference interaction sequences within a set of reference interaction data are identified (512) that correspond to the obtained (510) interaction sequences utilizing processes similar to those described above. In a number of embodiments, determining (514) if the obtained (510) interaction sequence is similar to the identified (512) reference interaction sequence(s) is performed utilizing processes similar to those described above. In several embodiments, the similarity of two interaction sequences is determined (514) using a similarity score calculated based on the matching labels and/or gaps between the two interaction sequences. A variety of other techniques, including determining the longest common subsequence between two interaction sequences, can be utilized as appropriate to the requirements of specific applications in accordance with embodiments of the invention.

If one or more similar reference interaction sequences within the set of reference interaction data are not determined (514) with respect to the obtained (510) interaction sequence, the set of reference interaction data can be refined (518) to include the obtained (510) interaction sequence. In this way, the set of reference interaction data is updated to include newly discovered interaction sequences. In many embodiments, refining (518) the set of reference interaction data includes incorporating metadata describing the context of the interaction sequence (e.g. related interaction sequences within a set of interaction data), the time of the interaction sequence, (demographic) information regarding the group members performing the interaction sequence, and/or any other metadata as appropriate to the requirements of specific applications in accordance with embodiments of the invention.

If one or more similar reference interaction sequences within the set of reference interaction data are determined (514) with respect to the obtained (510) interaction sequence, the outcomes of the identified (512) reference interaction sequences and the obtained (510) interaction sequence are compared (516). In a variety of embodiments, comparing (516) the interaction outcomes includes comparing the space (e.g. idea vs. reality) of the performed interactions. The outcomes of an interaction sequences can be expressed as metadata describing the context of the labels representing the actions by the group members within the interaction sequence. By analyzing the labels representing an action, a determination can be made regarding if a particular action was beneficial, detrimental, or neutral to the dynamic of the group interaction. The outcome of an interaction sequence can be determined by analyzing some or all of the actions within the interaction sequence and determine, in aggregate, if the entire sequence was beneficial, detrimental, or neutral to the overall dynamic of the group interaction across one or more interaction sequences. In several embodiments, refining (518) the set of reference interaction data includes updating metadata in the set of reference interaction data associated with the identified (512) reference interaction sequences describing the outcome(s) of the reference interaction sequences based on the outcome of the obtained (510) interaction sequence. In this way, as the reference interaction sequences are recommended to groups and utilized in real-world group interactions, the utility of the reference interaction sequences to the group can be tracked and updated in order to make more relevant interaction sequence recommendations. Likewise, as the utility of particular interaction sequences changes over time, the reference interaction data is updated to reflect the changing utility of particular interaction sequences. In many embodiments, refining (518) the reference interaction data includes refining a set of intervention data stored within an intervention database that provides coaching actions that can be utilized to aid the members of a group in performing the recommended interaction sequences.

Specific processes for the refinement of reference interaction data are discussed above with respect to FIG. 5; however, any of a variety of processes, including those that modify the reference interaction data utilizing alternative techniques and those that determine sequence similarity utilizing non-pairwise techniques, can be performed in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A group interaction diagnostic and recommendation server system for processing combined verbal, gestural, and body language communications data, comprising:
a processor; and
a memory configured to store:
 a group interaction diagnosis application; and
 a set of reference interaction data, where the reference interaction data comprises a set of reference interaction sequences;
wherein the group interaction diagnosis application configures the processor to:
 obtain a set of group interaction data, the group interaction data comprising video data and audio data recording verbal, gestural, and body language communications within a working team;
 generate an interaction model based on the group interaction data and an interaction dynamics language, where the interaction dynamics language comprises a set of labels describing actions that can occur in response to an action by a speaker in an interaction sequence including forward labels, blocking labels, and supporting labels;
 determine at least one interaction sequence within the set of group interaction data based on the generated interaction model;
 identify at least one matching interaction sequence by comparing the determined at least one interaction sequence with the set of reference interaction sequences;
 determine a recommendation including at least one improved interaction sequence within the set of reference interaction sequences, based on the identified at least one matching interaction sequence and the set of reference interaction data, wherein the at least one improved interaction sequence is identified as being more conducive to group interaction than a corresponding interaction sequence within the determined at least one interaction sequence; and
 presenting the recommendation on an output device during communications within the working team.

2. The group interaction diagnosis and recommendation server system of claim 1, wherein the set of labels in the interaction dynamics language comprises a subset of forward labels.

3. The group interaction diagnosis and recommendation server system of claim 2, wherein the subset of forward labels is selected from the set of labels consisting of a "move" label, a "question" label, an "overcoming" label, a "deflection" label, and a "yes and" label.

4. The group interaction diagnosis and recommendation server system of claim 1, wherein the set of labels in the interaction dynamics language comprises a subset of blocking labels.

5. The group interaction diagnosis and recommendation server system of claim 4, wherein the subset of blocking labels is selected from the set of labels consisting of a "hesitation" label, a "block" label, and an "interruption" label.

6. The group interaction diagnosis and recommendation server system of claim 1, wherein the set of labels in the interaction dynamics language comprises a subset of supporting labels.

7. The group interaction diagnosis and recommendation server system of claim 6, wherein the subset of supporting labels is selected from the set of labels consisting of a "humor" label, a "support for move" label, and "a support for block" label.

8. The group interaction diagnosis and recommendation server system of claim 1, wherein the set of labels in the interaction dynamics language comprises a label selected from the group consisting of a "beginning" label and an "ending" label.

9. The group interaction diagnosis and recommendation server system of claim 1, wherein a label in the set of labels in the interaction dynamics language includes timing data describing the time associated with the action corresponding to the label.

10. The group interaction diagnosis and recommendation server system of claim 1, wherein a label in the set of labels in the interaction dynamics language includes member metadata describing the group member performing the action corresponding to the label.

11. The group interaction diagnosis and recommendation server system of claim 1, wherein the group interaction diagnosis application further configures the processor to identify at least one matching interaction sequence within the determined at least one interaction sequence by:
    determining at least one subsequence of labels within the at least one interaction sequence;
    locating a relevant portion of the set of reference interaction data, where the relevant portion of the set of reference interaction data comprises at least one reference subsequence of labels; and
    aligning the at least one subsequence of labels to the relevant portion of the set of reference interaction data so that the at least one subsequence of labels corresponds to the at least one reference subsequence of labels.

12. The group interaction diagnosis and recommendation server system of claim 11, wherein the group interaction diagnosis application further configures the processor to align the at least one subsequence of labels utilizing genomic sequence alignments selected from the group consisting of global alignments and local alignments.

13. The group interaction diagnosis and recommendation server system of claim 11, wherein the group interaction diagnosis application further configures the processor to score the aligned subsequences based on the number of corresponding labels between the at least one subsequence of labels and the at least one reference subsequence of labels.

14. The group interaction diagnosis and recommendation server system of claim 13, wherein the group interaction diagnosis application further configures the processor to recommend at least one improved interaction sequence based on the scored aligned subsequences.

15. The group interaction diagnosis and recommendation server system of claim 1, wherein the group interaction diagnosis application further configures the processor to refine the reference interaction data based on the identified interaction sequences.

16. The group interaction diagnosis and recommendation server system of claim 15, wherein the group interaction diagnosis application further configures the processor to refine the reference interaction data by:
    locating at least one new interaction sequence within the at least one interaction sequence not present within the reference interaction data; and
    including the at least one new interaction sequence in the reference interaction data.

17. The group interaction diagnosis and recommendation server system of claim 1, wherein a label in the set of labels in the interaction dynamics language comprises space metadata describing the space associated with the action corresponding to the label.

18. The group interaction diagnosis and recommendation server system of claim 17, wherein the space metadata is selected from the group consisting of an idea space and a reality space.

19. The group interaction diagnosis and recommendation server system of claim 1, wherein the group interaction data further comprises video data and audio data recording facial expression communications within a working team.

20. The group interaction diagnosis and recommendation server system of claim 1, wherein the set of labels further includes elaborating labels.

21. The group interaction diagnosis and recommendation server system of claim 1, wherein:
    the memory is further configured to store an intervention database, where the intervention database comprises a set of intervention data and a set of interaction/intervention relationships; and
    the group interaction diagnosis application further configures the processor to identify at least one piece of intervention data based on the recommended at least one interaction sequence, where a piece of intervention data in the set of intervention data comprises data utilized by a coach to guide the members of the group through an interaction process.

22. A method for representing, diagnosing, and recommending group interactions based on combined verbal, gestural, and body language communications data, comprising:
    obtaining a set of group interaction data using a group interaction diagnosis and recommendation server system, the group interaction data comprising video data and audio data recording verbal, gestural, and body language communications within a working team;
    generating an interaction model based on the group interaction data and an interaction dynamics language using the group interaction diagnosis and recommendation server system, where the interaction dynamics language comprises a set of labels describing actions that can occur in response to an action by a speaker in an interaction sequence including forward labels, blocking labels, and supporting labels;
    determining at least one interaction sequence within the set of group interaction data based on the generated interaction model using the group interaction diagnosis and recommendation server system;

identifying at least one matching, interaction sequence by comparing the determined at least one interaction sequence with a set of reference interaction sequences using the group interaction diagnosis and recommendation server system, where a set of reference interaction data comprises the set of reference interaction sequences; and determining a recommendation including at least one improved interaction sequence within the set of reference interaction sequences, based on the identified at least one matching interaction sequence and the set of reference interaction data using the group interaction diagnosis and recommendation server system, wherein the at least one improved interaction sequence is identified as being more conducive to group interaction than a corresponding interaction sequence within the determined at least one interaction sequence; and presenting the recommendation on an output device during communications within the working team.

23. The method of claim 22, wherein the set of labels in the interaction dynamics language comprises a subset of forward labels.

24. The method of claim 23, wherein the subset of forward labels is selected from the set of labels consisting of a "move" label, a "question" label, an "overcoming" label, a "deflection" label, and a "yes and" label.

25. The method of claim 22, wherein the set of labels in the interaction dynamics language comprises a subset of blocking labels.

26. The method of claim 25, wherein the subset of blocking labels is selected from the set of labels consisting of a "hesitation" label, a "block" label, and an "interruption" label.

27. The method of claim 22, wherein the set of labels in the interaction dynamics language comprises a subset of supporting labels.

28. The method of claim 27, wherein the subset of supporting labels is selected from the set of labels consisting of a "humor" label, a "support for move" label, and "a support for block" label.

29. The method of claim 22, wherein the set of labels in the interaction dynamics language comprises a label selected from the group consisting of a "beginning" label and an "ending" label.

30. The method of claim 22, wherein a label in the set of labels in the interaction dynamics language includes timing data describing the time associated with the action corresponding to the label.

31. The method of claim 22, wherein a label in the set of labels in the interaction dynamics language includes member metadata describing the group member performing the action corresponding to the label.

32. The method of claim 22, wherein identifying at least one matching interaction sequence within the determined at least one interaction sequence comprises:

determining at least one subsequence of labels within the at least one interaction sequence using the group interaction diagnosis and recommendation server system;

locating a relevant portion of the set of reference interaction data using the group interaction diagnosis and recommendation server system, where the relevant portion of the set of reference interaction data comprises at least one reference subsequence of labels; and aligning the at least one subsequence of labels to the relevant portion of the set of reference interaction data so that the at least one subsequence of labels corresponds to the at least one reference subsequence of labels using the group interaction diagnosis and recommendation server system.

33. The method of claim 32, wherein aligning the at least one subsequence of labels utilizes genomic sequence alignments selected from the group consisting of global alignments and local alignments.

34. The method of claim 32, further comprising scoring the aligned subsequences based on the number of corresponding labels between the at least one subsequence of labels and the at least one reference subsequence of labels using the group interaction diagnosis and recommendation server system.

35. The method of claim 34, further comprising recommending at least one improved interaction sequence based on the scored aligned subsequences using the group interaction diagnosis and recommendation server system.

36. The method of claim 22, further comprising refining the reference interaction data based on the identified interaction sequences using the group interaction diagnosis and recommendation server system.

37. The method of claim 36, wherein refining the reference interaction data comprises:

locating at least one new interaction sequence within the at least one interaction sequence not present within the reference interaction data using the group interaction diagnosis and recommendation server system; and including the at least one new interaction sequence in the reference interaction data using the group interaction diagnosis and recommendation server system.

38. The method of claim 22, wherein a label in the set of labels in the interaction dynamics language comprises space metadata describing the space associated with the action corresponding to the label.

39. The method of claim 38, wherein the space metadata is selected from the group consisting of an idea space and a reality space.

40. The method of claim 22, further comprising identifying at least one piece of intervention data based on the recommended at least one interaction sequence using the group interaction diagnosis and recommendation server system, where a piece of intervention data in the set of intervention data comprises data utilized by a coach to guide the members of the group through a more effective interaction process.

41. The method of claim 22, wherein the group interaction data further comprises video data and audio data recording facial expression communications within a working team.

42. The method of claim 22, wherein the set of labels further includes elaborating labels.

* * * * *